(12) United States Patent
Li et al.

(10) Patent No.: US 10,974,976 B2
(45) Date of Patent: Apr. 13, 2021

(54) PH CONTROL METHOD FOR UPA CELL

(71) Applicant: KONINKLIJKE PHILIPS N.V., Eindhoven (NL)

(72) Inventors: Qing Li, Eindhoven (NL); Guangwei Wang, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 758 days.

(21) Appl. No.: 15/538,721

(22) PCT Filed: Dec. 22, 2015

(86) PCT No.: PCT/EP2015/081015
§ 371 (c)(1),
(2) Date: Jun. 22, 2017

(87) PCT Pub. No.: WO2016/102585
PCT Pub. Date: Jun. 30, 2016

(65) Prior Publication Data
US 2017/0349457 A1 Dec. 7, 2017

(30) Foreign Application Priority Data

Dec. 26, 2014 (WO) ................ PCT/CN2014/095121
Dec. 22, 2015 (EP) ..................... 15152479

(51) Int. Cl.
*C02F 1/461* (2006.01)
*C02F 1/469* (2006.01)

(52) U.S. Cl.
CPC .......... *C02F 1/4618* (2013.01); *C02F 1/4696* (2013.01); *C02F 2209/005* (2013.01); *C02F 2209/006* (2013.01); *C02F 2209/06* (2013.01); *C02F 2209/40* (2013.01)

(58) Field of Classification Search
CPC ................ C02F 2209/06; C02F 1/4618; C02F 2209/005; C02F 2209/006; C02F 2209/40; C02F 1/4696
See application file for complete search history.

(56) References Cited

U.S. PATENT DOCUMENTS

| 6,139,714 A * | 10/2000 | Livshits ................ C02F 1/4618 205/516 |
| 2003/0183516 A1* | 10/2003 | Klose .................. C02F 1/46109 204/288.1 |
| 2009/0114598 A1* | 5/2009 | van Kralingen .... A47L 15/4229 210/676 |
| 2009/0134029 A1* | 5/2009 | Tanahashi ............. C02F 1/4691 204/554 |
| 2009/0205975 A1 | 8/2009 | Tanahashi |

(Continued)

FOREIGN PATENT DOCUMENTS

| JP | 06238275 A | 8/1994 |
| JP | 2006167706 A | 6/2006 |

(Continued)

*Primary Examiner* — Shogo Sasaki

(57) ABSTRACT

The present invention relates to a device and method for controlling the pH of a UpA cell. The device comprises a receiving unit for receiving a preset parameter including a desired pH value; a computing module configured to calculate an UpA cell parameter based on the preset parameter; and a control module configured to control the UpA cell based on the calculated UpA cell parameter.

19 Claims, 4 Drawing Sheets

(56) References Cited

U.S. PATENT DOCUMENTS

2011/0042206 A1\* 2/2011 Tanahashi ............ C02F 1/4602
204/278.5
2015/0353389 A1 12/2015 Yang

FOREIGN PATENT DOCUMENTS

| JP | 2013126632 A | 6/2013 |
| KR | 20040010500 A | 1/2004 |

\* cited by examiner

PH CONTROL METHOD FOR UPA CELL

This application is the U.S. National Phase application under 35 U.S.C. § 371 of International Application No. PCT/EP2015/081015, filed on Dec. 22, 2015, which claims the benefit of International Application No. PCT/CN2014/095121 filed on Dec. 26, 2014 and International Application No. 15152479.0 filed on Jan. 26, 2015. These applications are hereby incorporated by reference herein.

FIELD OF THE INVENTION

The present invention relates to a device and method for determining the pH in an unidirectional pH adjustment cell. In particular, the present invention pertains to calculating the pH in a unidirectional pH adjustment cell.

BACKGROUND OF THE INVENTION

Unidirectional pH adjustments (UpA) of water may be used for unidirectionally producing acidic or alkaline water during water electrolysis. UpA cells are used in various applications, including cooking, brewing, food cleaning, descaling, etc.

Water electrolysis is a process where the water molecules are split into a hydrogen and oxygen gas shown in equation (1), by electrical power. Usually, an electrolytic cell is employed. At an anode, water molecules are oxidized to oxygen gas while generating hydrogen ions (equation (2)). At a cathode, water molecules are reduced to hydrogen gas while generating hydroxide ions (equation (3)).

$$2H_2O \rightarrow 2H_2 + O_2 \quad (1)$$

$$2H_2O - 4e^- O_2 + 4H^+ \quad (2)$$

$$4H_2O + 4e^- \rightarrow 2H_2 + 4OH^- \quad (3)$$

During unidirectional pH adjustment only the pH of water at a counter electrode is changed while that at the working electrode is maintained stable. Several measures may be taken to realize unidirectional production of acidic or alkaline water through stabilizing the pH of water at working electrode, including chemical neutralization or ion exchange (using resins) of undesired hydrogen ions or hydroxide ions, employing a buffer solution as the half-cell electrolyte, capacitor-based technology to suppress the half electrode reaction, etc.

pH control of a UpA cell is or great importance during operation. On the one hand pH control ensures that water with a desired pH is produced upon different applications. In addition, water quality is ensured. Generally, realizing the control of pH requires using at least one pH sensor such as printed pH sensors and conventional pH electrodes, is required the measure to pH value of the produced water from UpA cell. The measured value is then transmitted to the control part to accordingly adjust the relevant device parameters to achieve the desired pH value.

JP 2006167706 discloses an ion water generator wherein the pH is adjusted electrolytically. The pH of the ion water generator is controlled by employing a conductivity sensor for determining conductivity of water after passing the electrolytic chamber.

In particular, for domestic use controlling the pH of generated water from UpA cell, employing a pH or any other sensor for indirectly determining pH, such as a conductivity sensor, is relatively expensive, and to some extent, not necessary because in some applications, the requirement for the pH value is not so accurate (for instance, for food cleaning, each value in the range of 11-13 is considered acceptable).

The sensors apparently employed in UpA devices are further prone to technical failure. In addition, the sensors are rather complicated with respect to maintenance and proper use.

SUMMARY OF THE INVENTION

It is therefore an object of the invention to provide a device and method for controlling the pH of an UpA cell which is easy to use and reliable. Another objective resides in the provision of a device and method which do not need the use of any sensor for determining directly or indirectly the pH value of outlet water. Still another objective resides in the provision of a robust an inexpensive device for controlling the pH of an UpA cell.

In a first aspect of the present invention a device for controlling the pH of a unidirectional pH adjustment cell (UpA) is provided. The device comprises a receiving unit for receiving a preset parameter including a desired pH value; a computing module configured to calculate an UpA cell parameter based on the preset parameter including the desired pH value; and a control module configured to control the UpA cell based on the calculated UpA cell parameter.

According to another aspect of the present invention a method for controlling the pH of an UpA cell is provided. Said method comprises: receiving a preset parameter including a desired pH value; calculating an UpA cell parameter based on the preset parameter including the desired pH value; controlling the UpA cell based on the calculated UpA cell parameter.

In yet further aspects of the present invention, there is provided a computer program which comprises program code means for causing a computer to perform the steps of the method disclosed therein when said computer program is carried out in a computer.

The present device and method for controlling the pH of an UpA cell refer to the use of a model-based computing, which is used for determining the desired device and method parameter settings based on a desired pH requirements. The present device and method therefore rely on calculation and do not require any estimation/correlation. There is no need that a sensor for directly or indirectly determining pH is involved, such as a pH sensor or conductivity sensor, which renders the present device method cost efficient, reliable and suitable for domestic use. In addition, pH calculated by the present device and method reflects the pH prevailing at the working electrode surface of an UpA and not to the pH determined by use of a convention pH sensor at any point downstream the UpA. Knowledge of the pH at the counter electrode surface assists in enlarging the working electrode's lifetime and avoids deactivation of the electrode since extreme pH values at the electrode's surface may be avoided. In addition, knowledge of the pH at electrode's surface assists in electrode regeneration.

pH of the inlet water or feed water and pH of the outlet water needs to be distinguished for the present device and method. pH of the outlet water, i.e. of water having a desired pH value, is used for calculating an UpA cell parameter, such as operating time and a power supply parameter. The pH of the inlet water is either preset or may be determined in advance of using the device and/or method in a known manner, using for examples a sensor, such as a pH sensor, and pH indicator paper. The use of the pH indicator paper is preferred. Preferably, determining the pH value of inlet water is performed only one time, namely for setting up the present device. It will be appreciated that the pH of the inlet water may be controlled on a regular basis and the preset parameters may be adapted accordingly. This initial pH value may serve as one of the preset parameters of the present device and method.

Any UpA cell known in the art may be used. Such an UpA cell may essentially comprise a vessel and two electrodes located therein. The electrodes are essentially planar and arranged on opposite sides of the vessel permitting electrophoresis of water. The counter electrode is the electrode at which oxidation or reduction of water occurs. This electrode may be made for instance from titan. Alternatively, various kinds of stainless steel may be employed. The working electrode may be made essentially from the same materials. At the working electrode essentially no oxidation or reduction of the water occurs. This may be achieved by providing the working electrode with alternating current. Alternatively or additionally, chemical neutralization may take place using for instance acids or bases added to the water. Preferably, such acids or bases are food compatible and comprise for instance NaOH, KOH, HCl, and $H_2SO_4$. Ion exchange using known resins for removing either undesired hydrogen ions or hydroxide ions may be used as well. Other possibilities encompass the use of buffer solutions as the half-cell electrolyte for the counter electrode, and/or capacitor-based technology to suppress the half-electrode reaction. A diffusion layer is located within the vessel of the UpA cell sharing the vessel's inner space in two parts. The diffusion layer is preferably arranged close to the electrodes. In addition or alternatively, the diffusion layer is arranged essentially parallel to the working electrode. The diffusion layer hence separates the inner space in a big volume, the water bulk, between diffusion layer and working electrode and a comparatively small volume between the diffusion layer and the counter electrode. The ratio between the water bulk volume and the small volume may be 10:1 or more. Preferred is a relationship of 20:1 or more, such as 50:1 or more, 100:1 or more, 200:1 or more, 300:1 or more, and 400:1 or more. Preferably, the ratio of the water bulk volume to the small volume is at least 500:1. The term "diffusion layer" as used herein preferably refers to a virtual layer formed by a thin water layer, but usually with large concentration gradient resulted by the limited diffusion rate. Thickness of the water layer forming the diffusion layer is affected by a number of parameters including for instance current, flow conditions within the cell, and content of electrolytes.

The inlet water used for the present device and method is not particularly limited and may for example include tap water and/or industrial water. Tap water is being preferred. It will be however appreciated, that the present device and method are not limited to the use of water. Rather any aqueous solution may be used the pH of which shall be unidirectionally adjusted. An "aqueous solution" as used herein comprises any mixture of water with any organic constituent, such as an organic compound, and/or inorganic constituents, such as inorganic salts, i.e. electrolytes.

The UpA cell may further have a power source connected to the working electrode and counter electrode, respectively, to provide the required current to enable electrophoresis. The power source is not particularly limited. Any kind of power source may be employed.

In addition, the UpA cell may be provided with an inlet and outlet. At an inlet side a flowmeter has been provided for controlling flow of water provided to the UpA cell. Accordingly, continuous and/or discontinuous UpA cells are encompassed. A continuous UpA cell is preferred since it requires less space due to the fact that a smaller vessel volume may be employed.

The term "preset parameter" as used herein, refers to a number of parameters characterizing for instance the water which shall be subjected to UpA. These parameters include a desired pH value, i.e. the pH of the outlet water which shall be consumed. Other preset parameters comprise for instance an initial pH value representing the pH of the water before entering the UpA cell, such as the pH of tap water, a flow dynamic of feed water, a flow dynamic of generated water.

The expressions "flow dynamics" or "fluid dynamics" refer to the movement of the inlet and outlet water as well as the bulk water in motion. These fluid dynamics of feed water and generated water may be used for effecting controlling of the UpA cell. In particular, said parameters are used for calculating an UpA cell parameter.

Other preset parameters may be used for characterizing the UpA cell, such as dimensions, and used materials. A rather simple UpA cell is characterized by a number of variables encompassing thickness of the reaction layer located between diffusion layer and counter electrode, diffusion index, thickness of the diffusion, water volume, and diffusion cross area. Further parameters include constants, such as Faraday constant.

The device is preferably adapted to automatically receive a preset parameter, i.e. upon connecting with a particular UpA cell. The UpA cell may be provided accordingly including means for providing the preset parameters to the present device.

The receiving unit is not particularly limited. For instance, the receiving unit is an input unit for inputting preset parameters and/or UpA cell parameters permitting setup of the device according to the devices specification and/or water used as feed water. "Computing module" and/or "control module" are known to the skilled person and comprise, for instance, a processor and hardware controller.

The term "calculate" or "computing" as used herein pertains to asserting by computation. Preferably, making estimation or evaluating are not encompassed. Accordingly, calculating preferably refers to a pure mathematical method employing the use of one or more equations establishing a relation ship between devices input, i.e. the UpA cell parameter(s) calculated from the preset and/or inputted values to enable controlling the UpA cell.

According to a preferred embodiment of the present invention, the receiving unit further receives at least one preset parameter selected from the group consisting of an initial pH value, a flow dynamic of feed water, and a flow dynamic of generated water, a thickness of reaction layer, electrochemical reaction rate, diffusion index, a thickness of diffusion layer, a water volume, and a diffusion cross area.

As mentioned above, a preset parameter refers to parameters described in properties of the feed water and/or generated water. These properties may include pH, flow rate, tubular and/or laminar flow, viscosity, and temperature. Any combination of preset parameters may be employed. For instance, only the initial pH value or a flow dynamic of the feed water or the flow dynamic of the generated water may be employed. Preferably, all three parameters are used. The preset parameter refers further to parameters characterizing the UpA cell which shall be employed (and controlled). Such UpA cell parameter are preferably selected from the group consisting of a thickness of reaction layer, an electrochemical reaction rate, diffusion index, a thickness of diffusion layer, a water volume of the cell, and a diffusion cross area.

In case of the above-mentioned and preferred UpA cell comprising a vessel with working electrode and counter electrode further exhibits a diffusion layer sharing the vessel's volume in a small volume between diffusion layer and counter electrode and a water bulk volume between the diffusion layer and working electrode. This system is characterized by a number of variables encompassing thickness of the reaction layer located between diffusion layer and counter electrode. The electrochemical reaction rate relates to the flow of electrons per time unit in maybe measured for instance using an ammeter, including a moving coil ammeter, moving magnet ammeter, moving iron ammeter, hot-wire ammeter, a digital ammeter, and an integrating ammeter. Further examples encompass picoammeters. The diffusion index or diffusion coefficient or diffusivity is a proportionality constant between molar flux due to molecular diffusion and a gradient in a concentration of the species. Diffusion coefficients in liquids may be also calculated employing the Stokes-Einstein equation. Alternatively, a diffusion index may be empirically determined. Thickness of the diffusion layer refers to either the thickness of the membrane employed, such as a nafion membrane, or the sum of thickness of two membranes and an electrolyte solution in case two membranes and an electrolyte solution therebetween are employed for sharing the reaction layer from the water bulk. Water volume refers to the overall amount of water in the vessel, i.e. the water bulk volume and the volume of the reaction layer. Since the volume of the reaction layer is essentially neglectable, the overall amount of water in the vessel may be considered corresponding to the water bulk. The diffusion cross area describes the surface area of the diffusion layer. A further parameter represents the Faraday constant.

The above-mentioned parameters are preferably all preset. Accordingly, a user of the device does not need to enter the value of the Faraday constant and of the diffusion index.

Further values relating to UpA cell parameters are operation time or reaction time indicating a time span required for obtaining a desired pH value in the UpA cell. Still another parameter is a power supply parameter, including for instance current, required to generate water having the desired pH value within a given time. Usually one of these parameters, either operation time or power supply parameter is preset. In this case the other parameter, either power supply parameter or operation time, is calculated and used for controlling the device. Power supply parameters include for instance current and voltage. A number of these power supply parameters depends on the power supply characteristics and may be thus preset. Other parameters may be calculated by knowing equations known in the state of the art. Preferably all power supply parameters with exception of current are known and preset.

The present device and method enable for instance preset and/or (manual) input of power supply parameters. In this case, the computing module only calculates operating time. In this case, operating time is inversely proportional to the current employed. Alternatively and preferably both parameters operating time and power supply parameter, preferably current, are calculated by the computing module. In this case, the computing modules preferably adjusted to employ a medium value for a current and a medium value for operating time.

According to a preferred embodiment of the present invention, the computing module is further configured to calculate the UpA cell parameter based on equations (4) to (7):

$$d*(dC_s/dt)=r-D*(C_s-C_b)/L \quad (4),$$

$$r=I/F \quad (5),$$

$$V*(dC_b/dt)=D*A*(C_s-C_b)/L \quad (6),$$

wherein d is thickness of reaction layer, $C_s$ is concentration of $OH^-$ in the reaction layer, t is time, I is current, F is Faraday constant, D is diffusion index, $C_b$ is concentration of $OH^-$ in the bulk water, L is thickness of diffusion layer (L), V is water volume, A is diffusion cross area; and $$C_{s0}=C_{b0}=10^{pH0-14}*1000 \quad (7),$$

wherein $C_{s0}$ is initial concentration of $OH^-$ in the reaction layer, $C_{b0}$ is initial concentration of $OH^-$ in water, and pH0 is the initial pH value of water.

This preferred embodiment addresses generation of hydroxide ions for rendering water basic or protons for rendering water acid. Exemplifying for instance generation of hydroxide ions for rendering the water more basic, the amount of hydroxide ions close to the counter electrode and hence in the reaction layer increases because of electrochemical reaction and decreases of mass diffusion to the bulk water, thus, $$d*(dC_s/dt)=r-D*(C_s-C_b)/L \quad (4),$$

$$r=I/F \quad (5).$$

For the bulk layer, the amount of $OH^-$ is increased because of mass diffusion from the diffusion layer, thus, $$V*(dC_b/dt)=D*A*(C_s-C_b)/L \quad (6),$$

solving equations (4)-6), the evolutions of hydroxide concentrations at an electrode surface as well as in the water bulk are obtained. The initial values for the hydroxide concentration in the reaction layer and for hydroxide in the bulk water are equal and may be therefore calculated on the basis of the pH value of the feeding water, such as feed tap water, using $$C_{s0}=C_{b0}=10^{pH0-14}*1000 \quad (7).$$

One preferred method for determining the pH value of feed water, for the initial pH value of water, is the use of pH indicator paper. The common standard for the pH value of tap water is usually in the range of from pH 6.5 to 8.5. Accordingly, a user may measure the pH value using a pH indicator paper and input that value into the present device for subsequent use. Alternatively, said value may be preset.

It will be appreciated that the use of the above mentioned equations (4) to (7) enables calculation of any parameter if the remaining parameters are known. Accordingly, the present device and method enable any combination of preset parameters with exception of one which is calculated from the preset parameters.

According to another embodiment of the present invention, the device further comprises the UpA cell, the UpA cell having a power source.

As mentioned above, any kind of UpA cell may be employed. In particular, each dimensions of an UpA cell may be used. The vessels of the UpA cell are, either, preferably cube-like or vessels with rectangular base area. This orientation facilitates parallel alignment of working electrode, diffusion layer and counter electrode. Accordingly, the relevant UpA cell parameters may be more easily determined. In addition, such a cube-like object or a vessel having a rectangular base area is more suitable for transporting and handling. The two electrode, the working electrode and the counter electrode, are connected to a suitable power source known in the art. Controlling power source is affected by the present device and method. The UpA cell may be discontinuous, i.e. with manually feeding inlet water and removing generated water, or continuous, i.e. with controlled inlet and outlet provided by e.g. a flowmeter. Continuous operation is preferred due to more efficient controlling possibility and the possibility to reduce dimensions of the UpA cell.

According to another preferred embodiment of the present invention, the pH adjustment cell does not comprise a pH sensor.

The term "pH sensor" pertains to any sensor suitable for directly or indirectly determining pH. pH sensor encompasses, for instance, pH electrodes and printed pH sensors. Sensors for indirectly determining pH encompass for instance conductivity sensors.

Accordingly, the present device and method relate to direct calculation/computing of an UpA cell parameter based on a desired pH value. Determining pH of generated water is preferably not encompassed. More preferably, the present device and method do not refer to any step relating to measuring any parameter, with the proviso of determining an initial pH value of inlet water.

According to another embodiment of the present invention, the device further comprises a flowmeter for controlling flow of water provided to the UpA cell.

A flowmeter enables flow measurement and relates therefore to quantification of bulk fluid movement. Flow may be measured in a variety of ways, including mechanical flowmeters, pressure-based meters, optical flowmeters, open-channel flow measurement, and electromagnetic, ultrasonic and coriolis flowmeters, laser doppler flow measurement. The flowmeter adjusts the flow rate to the UpA cell and is controlled by the present controller module. The use of a flowmeter enables a smaller UpA cell and continuous use of the device. Accordingly, the overall dimensions of the device may be smaller. Flow at the water outlet may be controlled by a valve, which may be electronically triggered.

According to a preferred embodiment of the present invention, the device further comprises a user interface for inputting the preset parameter and the UpA cell parameter.

A suitable user interface comprises for instance touchscreens, and conventional keyboards. The connection between user interface and a present device is not particularly limited and may comprise wireless or wired connection.

In addition, the present device may be adapted to storage of preset parameters and/or UpA cell parameters. For instance, the present device may encompass a storage unit adapted for permanently or temporarily storing any value, such as a preset value.

In general, some parts of the device may be located remote from each other. For example, the optional user interface may be in form of an app for e.g. a mobile phone. An "app" as used herein, is a piece of software which can run on the internet, a computer, a mobile phone or another electronic device.

According to a preferred embodiment of the present invention, the device is used for enlarging a lifetime of an electrode of the unidirectional pH adjustment cell.

It has been surprisingly found that the present method and device enable enlarging the lifetime of an electrode of the unidirectional pH adjustment cell since extreme pH values at the electrode's surface may be avoided. This further enables regeneration of the electrode in due time and avoids deactivation of the electrode, i.e. assist in electrode maintenance. Accordingly, the present device and method enable also determining regeneration parameters of the electrode. Preferably, regeneration parameters enable correct assessment of time when electrode regeneration is required. Preferably, the lifetime of the working electrode is enlarged.

According to another embodiment of the present invention, the at least one preset parameter is selected from the group consisting of an initial pH value, a flow dynamic of feed water, and a flow dynamic of generated water, a thickness of reaction layer, electrochemical reaction rate, diffusion index, a thickness of diffusion layer, a water volume, and a diffusion cross area.

According to still another embodiment of the present invention, the preset parameter comprises at least a thickness of reaction layer, electrochemical reaction rate, diffusion index, a thickness of diffusion layer, a water volume, and a diffusion cross area.

According to an embodiment of the present invention, calculating the unidirectional pH adjustment cell parameter is based on equations (4) to (7):

$$d^{*}(dC_{s}/dt)=r-D^{*}(C_{s}-C_{b})/L \tag{4}$$

$$r=I/F \tag{5}$$

$$V^{*}(dC_{b}/dt)=D^{*}A^{*}(C_{s}-C_{b})/L \tag{6}$$

wherein d is thickness of reaction layer, $C_s$ is concentration of $OH^-$ in the reaction layer, t is time, I is current, F is the Faraday constant, D is diffusion index, $C_b$ is concentration of $OH^-$ in the bulk water, L is thickness of diffusion layer (L), V is water volume, A is diffusion cross area; and $$C_{s0}=C_{b0}=10^{pH0-14}*1000 \tag{7}$$

wherein $C_{s0}$ is initial concentration of $OH^-$ in the reaction layer, $C_{b0}$ is initial concentration of $OH^-$ in water, and pH0 is the initial pH value of water.

According to another embodiment of the present invention, the method further comprises controlling flow of water provided to the unidirectional pH adjustment cell.

According to still another embodiment of the present invention, the method further comprises inputting the preset parameter and the unidirectional pH adjustment cell parameter.

BRIEF DESCRIPTION OF THE DRAWINGS

These and other aspects of the invention will be apparent from and elucidated with reference to the embodiment(s) described hereinafter. In the following drawings

DETAILED DESCRIPTION OF THE INVENTION

Figure 1:
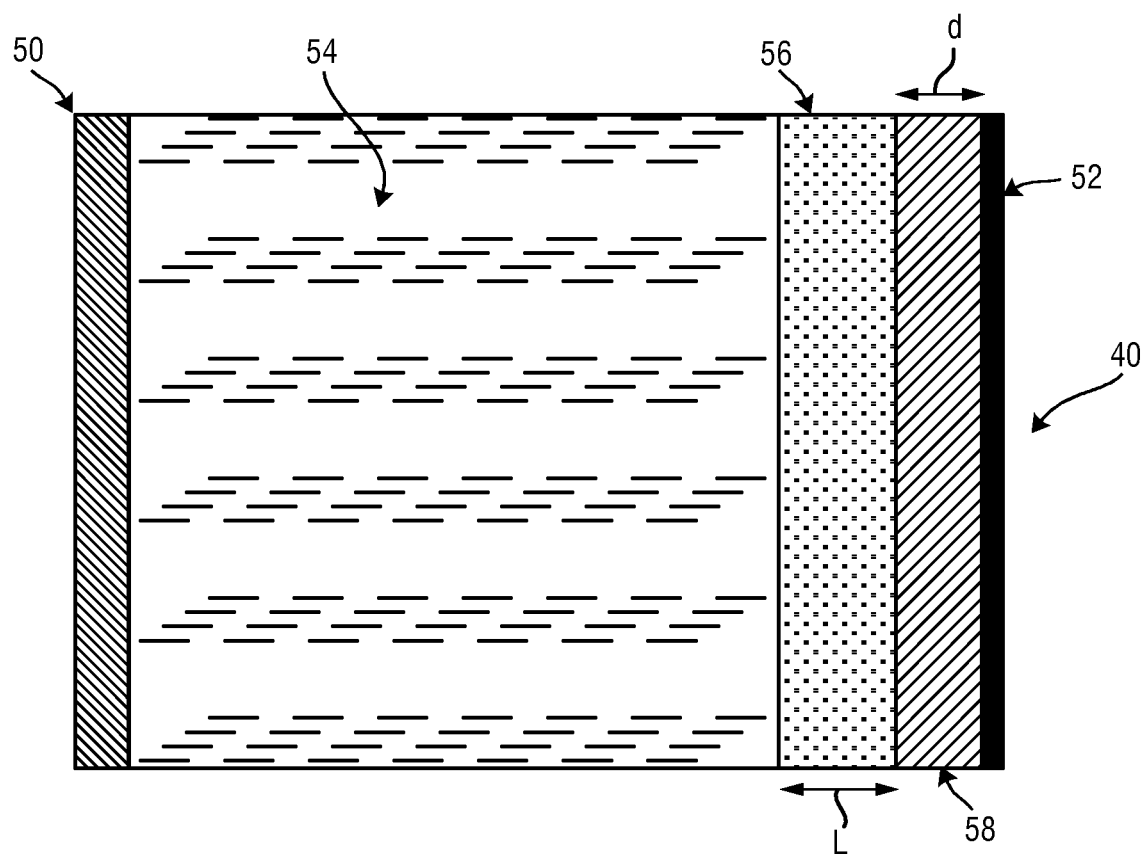
FIG. 1 shows a lateral view of an UpA cell for use with the present device.

FIG. 1 shows a lateral view of an UpA cell 40. The UpA cell 40 has a rectangular or square base area. Working electrode 50 and counter electrode 52 are arranged on opposite walls of the UpA cell facing each other. Alternatively, the working electrode 50 and counter electrode 52 may be side walls of the UpA cell or form an integral part thereof. Diffusion layer 56 is arranged parallel to the working electrode 50 and counter electrode 52 sharing the vessel volume in a large volume, the water bulk volume 54, and a small volume, the volume within the reaction layer 58. Thickness of reaction layer 58 is indicated by d and thickness of diffusion layer by L.

Figure 2:
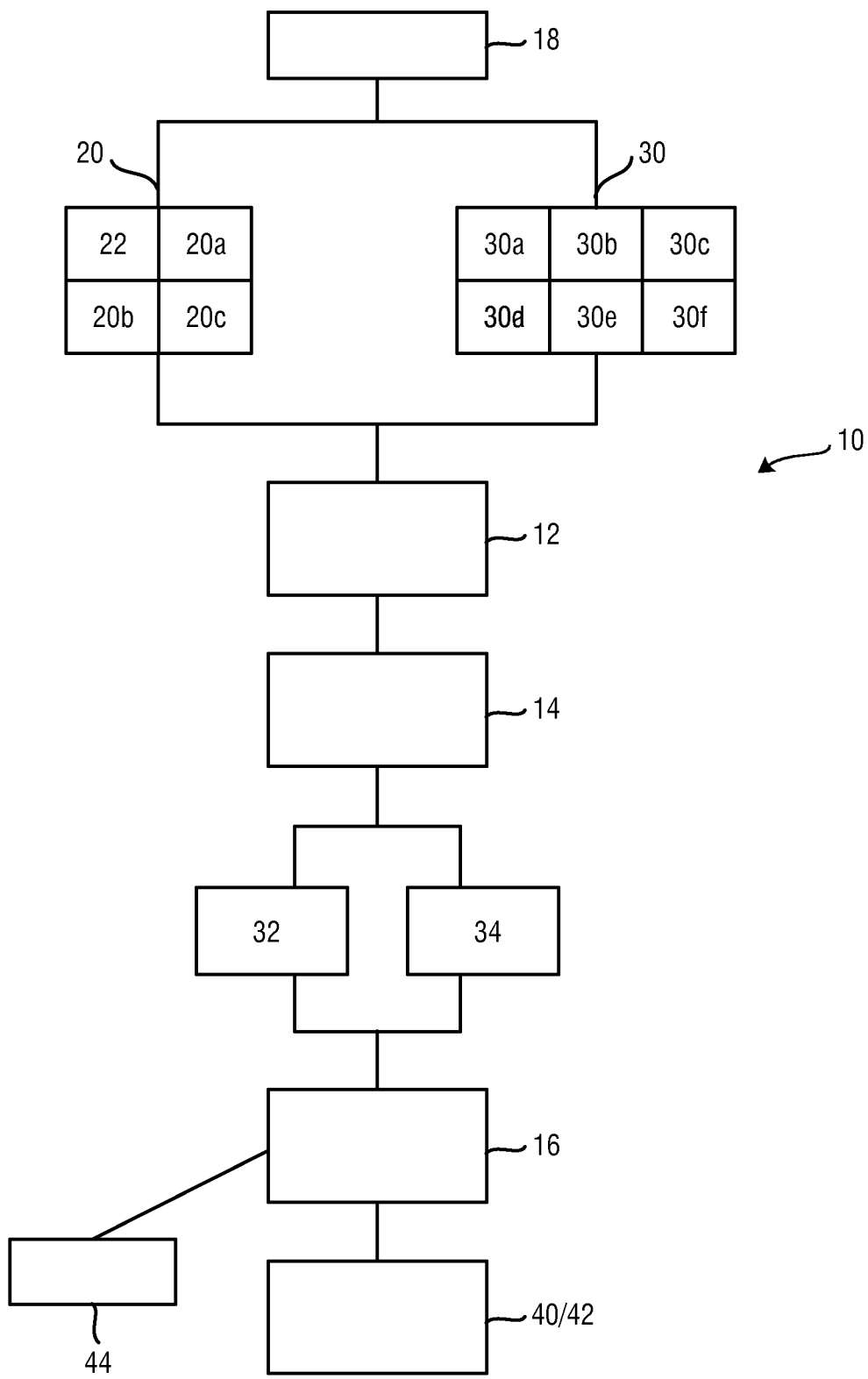
FIG. 2 schematically shows the main features of a device for controlling the pH of an UpA cell according to the invention.

FIG. 2 schematically shows a device 10 for controlling the pH of an UpA cell 40 according to the present invention. A receiving unit 12 receives preset parameters 20, 30 including a desired pH value 22, and other water related parameters, such as an initial pH value 20a, a flow dynamic of feed water 20b, and a flow dynamic of generated water. In addition, the receiving unit receives several preset parameters 30 characterizing the UpA cell 40 including the thickness of the reaction layer 30a, electrochemical reaction rate 30b, diffusion index 30c, thickness of diffusion layer 30d, a water volume 30e which is the water bulk volume, and a diffusion cross area. The preset parameters 20, 30, water related parameters and parameters characterizing the UpA cell, are in this example manually inputted by user interface 18 and permanently stored in a storage unit (not shown).

Computing module 14 is configured to calculate UpA cell parameters 32, 34 based on the preset parameters 20, 30. Further values which are required may be preset. Such values include for instance the Faraday constant which is not shown. UpA cell parameter 32 is according to this example the operating time of the UpA cell and UpA cell parameter 34 is the current employed. It will be appreciated that usually one of both parameters is also preset, for instance current which may be preset according to requirements of the national power supply. Alternatively operating time may be preset, such as one minute or more, preferably two minutes, three minutes, four minutes, five minutes, or ten minutes. In case both UpA cell parameters 32, 34 are not preset, the device 10 may choose a random value for either operating time or current and calculate the other parameter. Such random values are within acceptable ranges, for instance the examples given for a preset operating time. Alternatively, the device may employ a high current at the beginning which decreases with time.

Control unit 16 is configured to control the UpA cell and the power source 42 thereof based on a calculated UpA cell parameter 30. Said calculated UpA cell parameter 30 includes in a present case operating time 32 and a power supply parameter 34, which is in the present case the current. Due to inversely proportional relationship between operating time and current required for operating UpA cell. In FIG. 2 both possibilities, i.e. calculating of operating time 32 based on known power supply parameters 34 and calculating power supply parameter 34 based on known operating time, such as preset operating time, are shown. Control module 16 therefore affects required adjustments with UpA cell 40 having power source 42. In addition, control module 16 controls flowmeter 44 to provide a predetermined amount of water with predetermined flow parameters to UpA cell 40.

Figure 3:
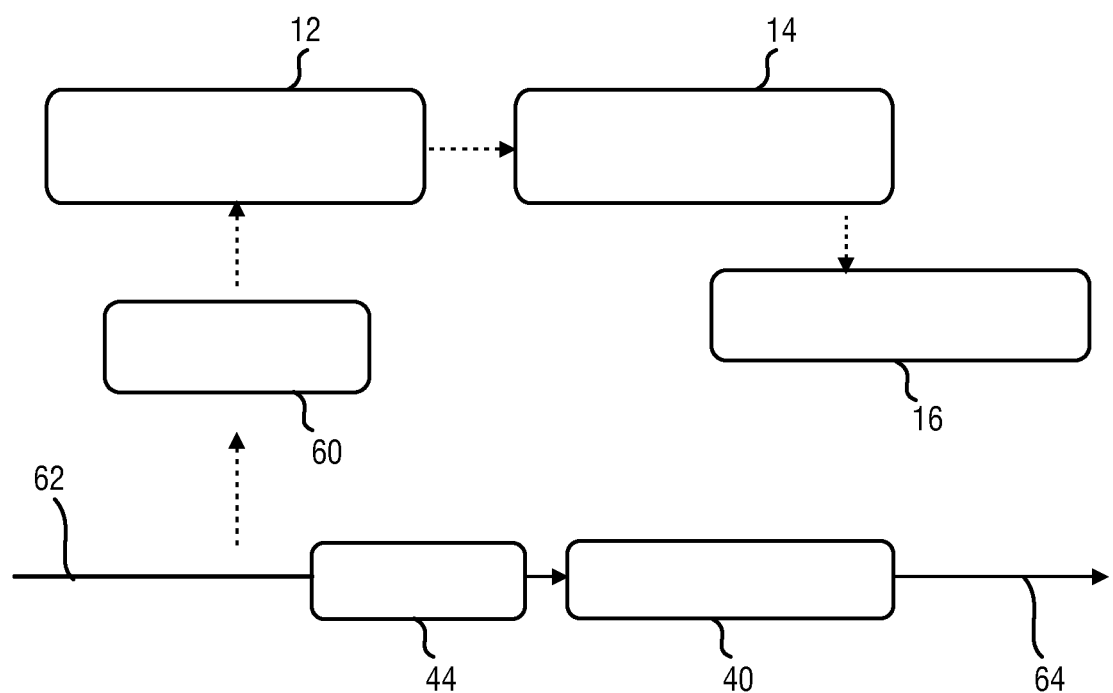
FIG. 3 schematically shows employing the present method.

FIG. 3 schematically shows performing of the method according to the present invention. Feed water 62 is provided to flowmeter 44 which in turn provides a predetermined amount of water to UpA cell 40. Depending on the amount of water having the desired pH within the UpA cell, generated water 64 is discharged. Feed water 62 is initially subjected to measuring the pH value by an indicator test paper 60. This value is received by the receiving unit 12 of device 10, and subjected to calculating/computing in computing module 14. All other required preset parameters 20, 30 including parameters 32 and/or 34 are prestored in device 10. Accordingly, control module 16 may readily control the UpA cell 40 and flowmeter 44 based on the prestored values.

Figure 4:
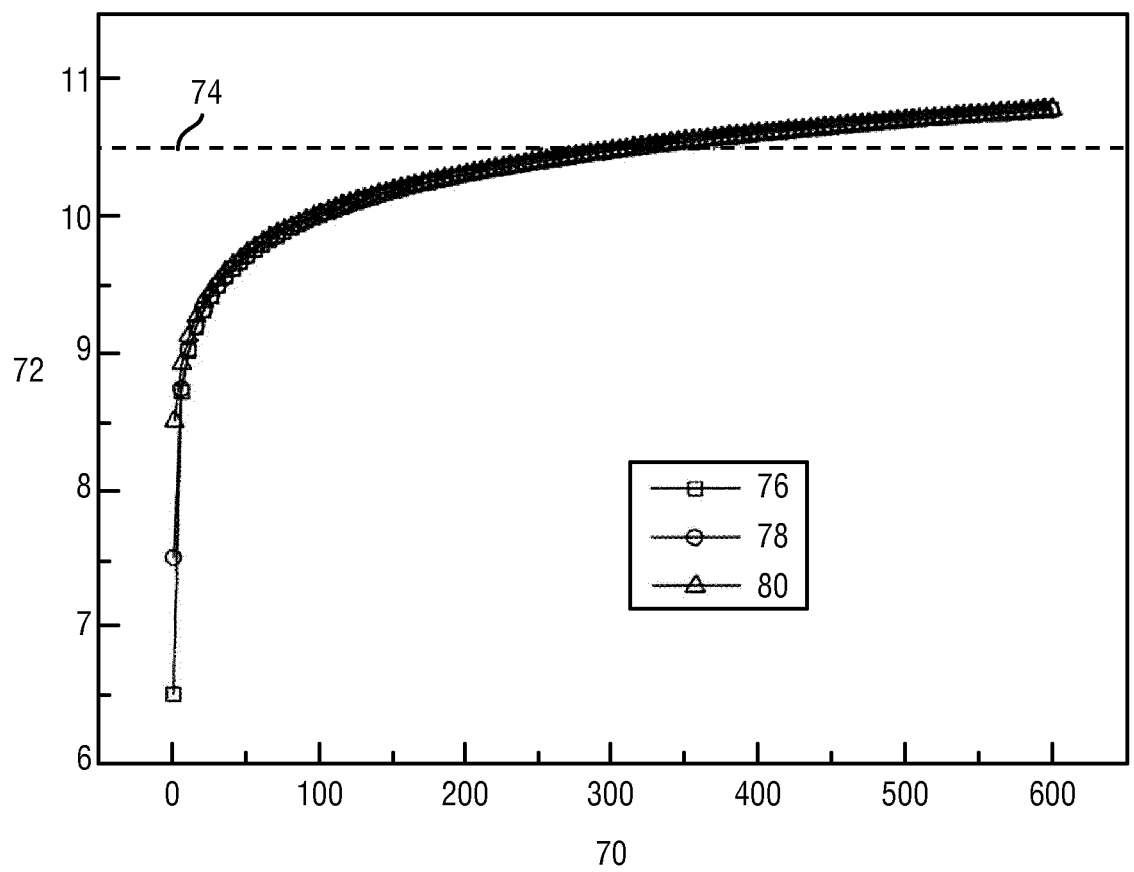
FIG. 4 shows the development of the pH value of bulk water independence of different initial pH values.

FIG. 4 shows development of pH value for bulk water for different initial pH values. The above mentioned UpA cell 40 is used for generating alkaline water. As indicated above, the concentrations of generated hydroxide ion may be predicted on the pre-established model with equations (4)-(7). FIG. 4 shows a simulation of hydroxide evolution and the influences of initial pH values on feed water, which is in this example tap water. Tap water has initial pH 6.5, 7.5, 8.5 indicated by reference numbers 76, 78, and 80. Axis 70 shows operating time in seconds and axis 72 development of pH value in the water bulk. The desired pH value is 10.5 (indicated by 74) and the volume the UpA cell 40 amounts to 1 l. The current is set to 1 A, thickness (d) of the reaction layer 58 is $10^{-7}$ m; diffusion index is $5*10^{-8}$ m$^2$/s, thickness (L) of the diffusion layer 56 is $10^{-5}$ m, Faraday constant is 96485 C/mol, diffusion cross area is 0.1 m$^2$, and total volume of water bulk amounts, as indicated above, $10^{-3}$/m$^3$.

It may be derived from FIG. 4 that variation of initial pH of water between the range of 6.5-8.5, which is usually for tap water, has a neglectable influence on the operating time needed for generation of 1 l qualified alkaline water of pH 10.5 (around 300 s), which indicates that measuring pH by pH indicator paper is accurate enough for use. Accordingly, the initial pH value is not critical and maybe either preset or measured in longer time intervals, such as one week or longer, preferably, two weeks, three weeks, one month, two months, three months or six months.

In conclusion, the device, and method presented herein reliably controls the pH value of an UpA cell. As an advantage, the use of sensors for determining/measuring pH value of generated water may be omitted rendering the device cost-efficient and less prone to technical failure. Another advantage is that lifetime of the working electrode is elongated and that maintenance of the working electrode is facilitated.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. A device for controlling the pH of an unidirectional pH adjustment cell, the device comprising:
   a receiving unit configured to receive a water related preset parameter characterizing water subject to an unidirectional pH adjustment by the unidirectional pH adjustment cell, wherein the water related preset parameter includes a desired pH value of the water;

a computing module configured to calculate an unidirectional pH adjustment cell parameter associated with the pH of the unidirectional pH adjustment cell based on an equational relationship between the unidirectional pH adjustment cell parameter and the water related preset parameter including the desired pH value of the water as received by the receiving unit; and a control module configured to control the unidirectional pH adjustment of the water by the unidirectional pH adjustment cell based on the unidirectional pH adjustment cell parameter as calculated by the computing module.

2. Device according to claim 1, wherein the preset parameter comprises at least a thickness of reaction layer, electrochemical reaction rate, diffusion index, a thickness of diffusion layer, a water volume, and a diffusion cross area.

3. Device according to claim 2, wherein the computing module is further configured to calculate the unidirectional pH adjustment cell parameter based on equations (4) to (7):

$$d*(dC_s/dt)=r-D*(C_s-C_b)/L \qquad (4),$$

$$r=I/F \qquad (5),$$

$$V*(dC_b/dt)=D*A*(C_s-C_b)/L \qquad (6),$$

wherein d is thickness of reaction layer, $C_s$ is concentration of $OH^-$ in the reaction layer, t is time, I is current, F is Faraday constant, D is diffusion index, $C_b$ is concentration of $OH^-$ in the bulk water, L is thickness of diffusion layer (L), V is water volume, A is diffusion cross area; and $$C_{s0}=C_{b0}=10^{pH0-14}*1000 \qquad (7),$$

wherein $C_{s0}$ is initial concentration of $OH^-$ in the reaction layer, $C_{b0}$ is initial concentration of $OH^-$ in water, and pH0 is the initial pH value of water.

4. The device according to claim 1,
wherein the unidirectional pH adjustment cell has a power source;
wherein the computing module is configured to calculate the unidirectional pH adjustment cell parameter including a power source parameter associated with the power source; and
wherein the control module is configured to control the unidirectional pH adjustment of the water by the unidirectional pH adjustment cell by controlling the power source based on the power source parameter.

5. The device according to claim 1, further comprising:
a flowmeter for controlling flow of the water being feed to the unidirectional pH adjustment cell, wherein the control module is further configured to control the flowmeter based on the unidirectional pH adjustment cell parameter calculated by the computing module.

6. The device according to claim 1, wherein the control module being configured to control the unidirectional pH adjustment of the water by the unidirectional pH adjustment cell includes an adjustment to a hydroxide ion concentration of the water within the unidirectional pH adjustment cell.

7. The device according to claim 1,
wherein the receiving unit is configured to receive a cell related preset parameter characterizing the unidirectional pH adjustment cell; and
wherein the computing module is configured to calculate the unidirectional pH adjustment cell parameter based on an equational relationship between the unidirectional PH adjustment cell parameter, the water related preset parameter including the desired pH value of the water as received by the receiving unit and the cell related preset parameter as received by the receiving unit.

8. The device according to claim 7, wherein the control module being configured to control the unidirectional pH adjustment of the water by the unidirectional pH adjustment cell includes an adjustment to a hydroxide ion concentration of the water within the unidirectional pH adjustment cell.

9. The device according to claim 1,
wherein the computing module is configured to calculate the unidirectional pH adjustment cell parameter including an operating time parameter associated with the unidirectional pH adjustment cell; and
wherein the control module is configured to control the unidirectional pH adjustment of the water by the unidirectional pH adjustment cell by controlling the operating time of the unidirectional pH adjustment cell based on the operating time parameter.

10. A method for controlling the pH of an unidirectional pH adjustment cell, the method comprising:
providing a device including a receiving unit, a computing module and a control module;
receiving, by the receiving unit, a water related preset parameter characterizing water subject to an unidirectional pH adjustment by the unidirectional pH adjustment cell, wherein the water related preset parameter includes a desired pH value of the water;
calculating, by the computing module, an unidirectional pH adjustment cell parameter associated with the pH of the unidirectional pH adjustment cell based on an equational relationship between the unidirectional pH adjustment cell parameter and the water related preset parameter including the desired pH value of the water received by the receiving unit; and
controlling, by the control module, the unidirectional pH adjustment of the water by the unidirectional pH adjustment cell based on the unidirectional pH adjustment cell parameter calculated by the computing module.

11. Method according to claim 10, wherein the preset parameter comprises at least a thickness of reaction layer, electrochemical reaction rate, diffusion index, a thickness of diffusion layer, a water volume, and a diffusion cross area.

12. Method according to claim 11, wherein calculating the unidirectional pH adjustment cell parameter is based on equations (4) to (7):

$$d*(dC_s/dt)=r-D*(C_s-C_b)/L \qquad (4),$$

$$r=I/F \qquad (5),$$

$$V*(dC_b/dt)=D*A*(C_s-C_b)/L \qquad (6),$$

wherein d is thickness of reaction layer, $C_s$ is concentration of $OH^-$ in the reaction layer, t is time, I is current, F is the Faraday constant, D is diffusion index, $C_b$ is concentration of $OH^-$ in the bulk water, L is thickness of diffusion layer (L), V is water volume, A is diffusion cross area; and $$C_{s0}=C_{b0}=10^{pH0-14}*1000 \qquad (7),$$

wherein $C_{s0}$ is initial concentration of $OH^-$ in the reaction layer, $C_{b0}$ is initial concentration of $OH^-$ in water, and pH0 is the initial pH value of water.

13. The method according to claim 10, further comprising:
controlling, by the control module, a flow of the water into the unidirectional pH adjustment cell based on the unidirectional pH adjustment cell parameter calculated by the computing module.

14. The method according claim 10, wherein the controlling, by the control module, the unidirectional pH adjustment of the water by the unidirectional pH adjustment cell includes adjusting the hydroxide ion concentration of the water within the unidirectional pH adjustment cell.

15. The method according claim 10, further comprising:
receiving, by the receiving unit, a cell related preset parameter characterizing the unidirectional pH adjustment cell; and
calculating, by the computing module, the unidirectional pH adjustment cell parameter based on an equational relationship between the unidirectional PH adjustment cell parameter, the water related preset parameter including the desired pH value of the water received by the receiving unit and the cell related preset parameter received by the receiving unit.

16. The method according claim 15, wherein the controlling, by the control module, the unidirectional pH adjustment of the water by the unidirectional pH adjustment cell includes adjusting the hydroxide ion concentration of the water within the unidirectional pH adjustment cell.

17. The method according claim 10, further comprising:
calculating, by the computing module, the unidirectional pH adjustment cell parameter including a power source parameter associated with a power source of the unidirectional pH adjustment cell; and
controlling, by the control module, the unidirectional pH adjustment of the water by the unidirectional pH adjustment cell by controlling the power source of the unidirectional pH adjustment cell based on the power source parameter.

18. The method according claim 10, further comprising:
calculating, by the computing module, the unidirectional pH adjustment cell parameter including an operating time parameter associated with the unidirectional pH adjustment cell; and
controlling, by the control module, the unidirectional pH adjustment of the water by the unidirectional pH adjustment cell by controlling the operating time of the unidirectional pH adjustment cell based on the operating time parameter.

19. A non-transitory computer readable medium comprising a computer program including program code means for causing a computer to carry out the steps of the method as claimed in claim 10 when said computer program is carried out on the computer.

* * * * *